July 27, 1965  M. B. MARSHALL  3,197,659
MOTION DAMPER FOR INTERMITTENT ROTARY DEVICES
Filed May 2, 1961
FIG. 1
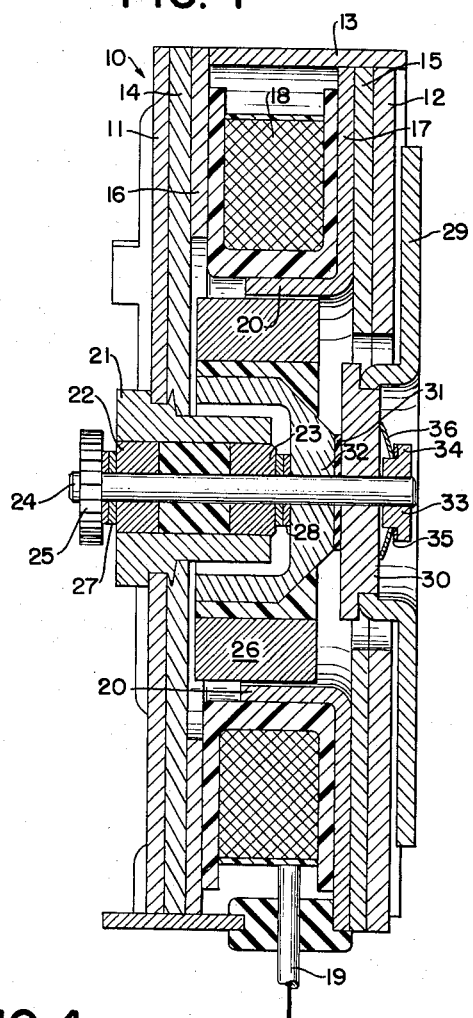
FIG. 2
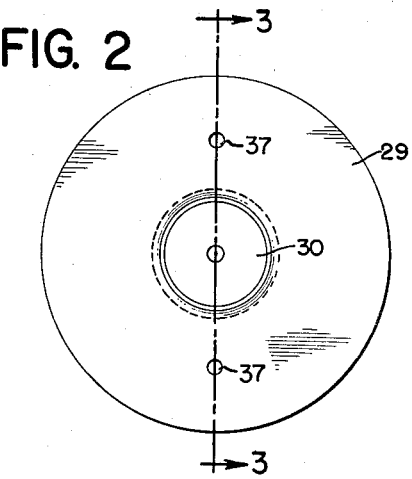
FIG. 3
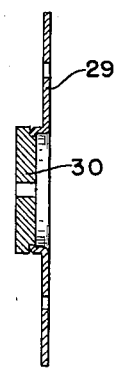
FIG. 4
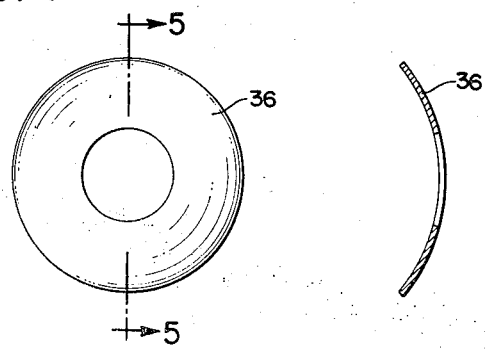
FIG. 5
INVENTOR
MAURICE B. MARSHALL
BY
ATTORNEYS United States Patent Office
3,197,659
Patented July 27, 1965

3,197,659
MOTION DAMPER FOR INTERMITTENT
ROTARY DEVICES
Maurice B. Marshall, Waterbury, Conn., assignor to Consolidated Electronics Industries Corp., Waterbury, Conn., a corporation of Delaware
Filed May 2, 1961, Ser. No. 107,271
3 Claims. (Cl. 310—49)

The present invention relates to a motion damper for intermittently moving rotary devices, and is directed more specifically to a novel and improved inertia-type motion damper for a rotary device such as a so-called stepper motor.

In connection with the operation of rotary devices for intermittent movement, with quick stop and start action, difficulty frequently is experienced in stopping the device with sudden deceleration at a precise position. This may be true not only of various essentially mechanical rotary movements, but is also true of electrical stepper motors, for example. Thus, in a typical application of a rotary stepper motor, it may be desirable to accelerate the rotor quickly, drive it through a predetermined angle of rotation, and stop it suddenly and precisely at a predetermined angular position. In electrical motors suitable for the purpose, the magnetic reluctance effects may be such as to cause substantial undesirable oscillation of the rotor about the desired stopping position. And, occasionally, the initial oscillation may be so severe as to cause the stepper rotor to "lock in" to an adjacent stopping position, resulting in undesirable inaccuracies in the operation.

In accordance with the present invention, a novel device is provided, particularly (although not necessarily) for use in combination with a high speed rotary stepper motor, for significantly damping rotor oscillations otherwise experienced in the sudden deceleration of the rotor. The new device comprises a member having a predetermined rotating inertia, which is driven by the intermittently rotating member of the stepper but which is connected thereto by a slip drive arrangement having a predetermined torque transmission level. The arrangement is such that, whenever the rotor is decelerated at such a rate that the torque force between the rotating inertia member and the decelerating rotor exceeds the predetermined slip torque level, the inertia member slips relative to the rotor. Accordingly, if the rotor is decelerated suddenly to a dead stop, at such a rate that the slip torque level of the inertia member is exceeded, the inertia member continues to rotate for a short interval, while decelerating at a rate determined by its rotating moment of inertia and the level of the slip torque. During this interval, which may be referred to descriptively as the inertia lag, the stopped rotor has applied thereto a 'forward" torque equal to the slip torque, which effectively prevents any significant "bounce-back" of the rotor and quickly dissipates the "bounce" energy of the rotor through friction losses due to controlled slippage.

In accordance with certain more specific aspects of the invention, an improved rotary motion damping arrangement is provided which is highly simplified in form, economical to manufacture, easy to incorporate with the rotary device, and unusually reliable in operation. In this respect, the new device comprises a practical minimum of parts, to simplify manufacture and improve reliability, and the parts are so designed as to facilitate accurate regulation or calibration during assembly.

For a better understanding of the above and other advantageous features of the invention, reference should be made to the following detailed description and to the accompanying drawing, in which:

FIG. 1 is a longitudinal cross sectional view of an advantageous embodiment of the new motion damping device, incorporated in combination with a high speed rotating electric stepper motor;

FIG. 2 is a plan view of an inertia member incorporated in the assembly of FIG. 1;

FIG. 3 is a cross sectional view taken along line 3—3 of FIG. 2;

FIG. 4 is a plan view of a spring element incorporated in the assembly of FIG. 1; and FIG. 5 is a cross-sectional view taken on line 5—5 of FIG. 4.

Referring now to the drawing, and initially to FIG. 1, the reference numeral 10 designates, generally, an electrical stepper motor. In this respect, it should be understood that, while the motion damping device of the invention is especially well adapted for use in combination with a high speed, low inertia stepper motor, such as that indicated by the numeral 10, many of the significant advantages of the invention may be realized in connection with the operation of other intermittent rotary devices, such as spring operated rotary devices, for example.

The specific details of construction and operation of the motor 10 are not critical factors of the invention. However, typically, such a motor may comprise a housing, formed of magnetic pole plates 11, 12 and a field ring 13. Shading discs 14, 15 lie inside the housing pole plates 11, 12 and inner pole plates 16, 17 lie inside the shading discs.

Between the pole plates 16, 17 is a stator coil assembly 18, which is formed with a central opening of predetermined size. Advantageously, the stator coil is center tapped, and appropriate lead wires 19 are provided to make the desired external connections.

Each of the poles plates 11, 12 and 16, 17 is provided with a predetermined plurality of pole lugs, typical ones of which are indicated at 20, which extend into the central aperture of the stator coil assembly in predetermined sequence and configuration to provide a desired plurality and arrangement of stator poles. The described construction is generally similar to that shown in the copending application of William D. Riggs, Ser. No. 19,958, filed April 4, 1960, for "Electro-Motive Apparatus."

Staked to the housing plate 11 is a bushing 21, which mounts spaced bearings 22, 23, which journal a rotor shaft 24. The shaft 24, which projects from both ends of the motor housing, may have a drive pinion 25 secured to one end and has a suitable rotor assembly 26 mounted for rotation within the housing and within the central opening of the stator coil assembly 18. Suitable thrust washers 27, 28, located between the pinion 25 and bearing 22 and between the bearing 23 and rotor assembly 26, keep the rotor shaft 24 in the desired axial position in the housing.

In the typical operation of the motor, the stator coil is controllably energized to effect a predetermined angular rotation of the rotor and its shaft to a precisely predetermined angular position, in movements of fifteen degrees, for example. And, typically, the energization is rapidly repetitive, such that the rotor is started and stopped with great frequency, the rotor inertia being sufficiently low in relation to the operating torque to provide for very fast acceleration and deceleration.

In attempting to stop the rotor rapidly in a precise angular orientation, difficulty is encountered because of reluctance effects between the poles of the rotor and the stator. This results, in effect, in a magnetic spring action, which causes substantial "bounce-back" and continuing rotary oscillations of the rotor. As will be understood, the rotor has a plurality of discrete angular positions in which it can be stopped and, on occasion, the "bounce-back" may be sufficient to shift the rotor backward one rotary step from the intended stopping position, but, even in less severe occasions of "bounce-back," continued rotary oscillation of the rotor is undesirable.

In accordance with the invention, novel arrangements are provided for controlling and substantially diminishing undesirable oscillations of the rotor upon the stopping thereof in a desired position. To this end, a member is provided which has a predetermined rotating moment of inertia, in relation to the inertia of the rotor and to the decelerating torque applied thereto and which is in predetermined frictional drive relationship with the rotor such that the energy of oscillation otherwise applied to the rotor, is quickly and controllably dissipated by friction losses.

In the specific assembly illustrated herein, the inertia member comprises, primarily, a disc 29, formed of a material of a weight suitable to provide a predetermined rotating moment of inertia, relative to the inertia and power of the motor. The illustrated inertia disc 29 is dished inward in the center, as at 30, and the center area advantageously is formed of a suitable bearing material, such as brass, which may be vacuum impregnated to the point of saturation with silicone oil, to impart desirable, controlled friction characteristics thereto.

The center disc 30, which may be referred to as a friction disc, is received closely on the rotor shaft 24, but is rotatable with respect to the shaft. Against the inner surface of the friction disc is a washer 31, advantageously formed of Teflon (polymerized tetrafluoroethylene), nylon, phenolic, or like material having uniform friction characteristics. The washer is interposed between the friction disc 30 and the hub 32 of the rotor 26, to provide controllably uniform frictional characteristics between these members.

Secured, by staking or otherwise, to the end of the rotor shaft 24, which projects beyond the friction disc 30, is a retainer 33, provided with an outer, radially projecting flange 34 forming an inwardly facing shoulder. An annular washer 35, advantageously formed of material having controllably uniform friction characteristics, such as Teflon, nylon, phenolic or the like, is received against the in-facing shoulder of the retainer.

In accordance with the invention, the inertia member 29 is maintained in predetermined friction-drive relation to the rotor 26 and its shaft 24 by means of a circular spring 36, which has a center aperture receiving the inner portion of the retainer 33 and which is curved such that its outer ends bear axially inward against the friction disc 30 while its center portion bears axially outward against the washer 35. The pressure of the spring 36 causes a predetermined friction to be developed between the inertia member 29 and the rotor assembly, and specifically between the friction disc 30 and the washer 31, between the washer 31 and the rotor hub 32, between the spring 36 and the washer 35, and between the washer 35 and the retainer 34. This accommodates rotational slippage between the rotor assembly and the inertia member upon the application thereto of a relative torque of predetermined magnitude, referred to herein as the slip torque. And the uniform friction characteristics of the friction disc 30 and the washers 31, 35 are such that the slip torque is substantially uniform in all relative rotary positions of the rotor and inertia member and under the various operating conditions normally encountered.

In a typical high speed stepper motor of typical proportions, having a housing of approximately 1¾" diameter by ⅝" length, a rotor diameter of about ¾" and a rated torque of about 15 gram-centimeters, about 7.5 gram-centimeters slip torque level may be advantageous, and this may be adjusted relatively accurately during manufacture by applying torque to the inertia member 29, using a suitable tool or gage inserted in openings 37 therein, while applying the retainer 33 axially to deflect the spring 36, until the desired slip torque level is reached. At this point, the retainer is staked or otherwise fixed to the rotor shaft.

In the operation of the assembled device, an energy pulse is supplied to the coil 18 to accelerate the rotor 26. Normally the acceleration of the rotor is such that the starting inertia of the inertia member causes the slip torque level to be exceeded, so that the acceleration of the inertia member lags that of the rotor. However, if the energizing pulse is of predetermined duration, the inertia member is accelerated to the speed of the rotor. It will be understood, however, that it is not actually necessary for the inertia to be accelerated to the rotor speed, as long as it is accelerated to a predetermined minimum speed, and the design of the components is such that the minimum speed will be reached under normal operating conditions.

When a driving pulse of constant polarity has advanced the rotor to its next successive position, it is influenced by a strong decelerating torque, such that the rotor is quickly decelerated to a dead stop at a discrete angular position determined by the number and location of the rotor and stator poles. Actually, under ordinary conditions, the rotor usually will come to a stop slightly beyond its discrete stopping position, and then tends to return sharply to the discrete "neutral" position. The magnetic influences on the rotor are, in fact, much like spring effects, such that the rotor will tend to continue in rotary oscillation, back and forth about the "neutral" or "detent" position, until the energy ultimately is dissipated by various mechanical and electrical losses in the motor.

In the combination assembly of the invention, the deceleration of the rotor occurs at a rate such that the forward torque of the rotating inertia member 29 exceeds the slip torque level during a short inertia lag interval. Thus, when the rotor is brought to a dead stop, for example, the inertia member 29 continues its forward rotation for a brief period, during which the rotor has applied thereto a constant forward torque, equal to the predetermined slip torque. And, as will be understood, the slip torque level is such in relation to other parameters of the motor, that the forward torque does not continue to advance the rotor to the next "detent" position.

While the decelerated rotor is subject to the usual forces tending to produce a magnetic spring effect and tending to cause magnetic "bounce-back" and oscillation, the "bounce" torque on the rotor is resisted by the constant slip torque, and the oscillation energy is quickly and controllably dissipated to an inconsequential level (by controlled friction losses) as the inertia member decelerates during the inertia lag period.

As will be understood, the motion damping arrangement of the invention is operable regardless of the direction of rotation of the assembly.

The new device, while being of ultimate simplicity, structurally, and easily and economically manufactured and installed, is highly effective in rendering high speed, intermittent rotary motion subject to precise control. And, although the invention is not so limited in its applications, it is useable to particular advantage in connection with the operation of electrical stepper motors, which are subject to high rates of deceleration, magnetically induced, and are designed for precision control of the angular "detent" position of the rotor.

It should be understood, however, that the specific form of the invention herein illustrated and described is intended to be representative only, since certain changes may be made therein without departing from the clear teachings of the disclosure. Accordingly, reference should be made to the following appended claims in determining the full scope of the invention.

I claim:
1. A compact stepper-motor-damper combination comprising
    (a) a stepper-motor having a rotatable output shaft carrying output pinion means,
    (b) an annularly shaped rotor having at least one friction surface disposed radially outward of said shaft, (c) said rotor being fixedly mounted on said output shaft, (d) an inertia member loosely mounted on said shaft adjacent said rotor friction surface and comprising a disc-like member having a friction surface, (e) a friction slip drive means acting axially between said inertia member and said rotor friction surface, (f) said slip drive means comprising a washer-like element formed of a material having controlled friction properties characteristic of polymerized tetrafluoroethylene, nylon and phenolic, and (g) spring means acting axially on said inertia member to urge said inertia member friction surface axially against said washer-like element to urge axially said washer-like element into predetermined pressure engagement with said rotor, (h) said slip drive means being operative to exert a predetermined slip torque between said inertia member and said rotor surface, (i) said slip torque causing controlled slippage between said rotor and said inertia member upon deceleration of said rotor, (j) said controlled slippage influencing the output of said shaft.

2. A compact stepper-motor combination according to claim 1 including (a) an annularly shaped housing substantially enclosing said stepper-motor, (b) said housing having two spaced end walls in a parallel relationship, (c) said output shaft projecting through said housing and beyond said end walls, (d) said output pinion means being fixed to said projecting shaft adjacent one end wall, (e) said disc-like inertia means being loosely mounted on said projecting shaft adjacent the other end wall and extending without the general outline of said other end wall, and (f) said slip drive means being located within said housing.

3. A compact stepper-motor-damper combination comprising (a) a stepper motor having a rotor means, a stator means, and a rotatable output shaft carrying an output pinion means, (b) housing walls substantially enclosing said stepper motor, (c) said stator means having a plurality of shaded and unshaded poles disposed in a predetermined circular pattern about said shaft, (d) energizing coil means disposed in a flux linking relation with said stator poles, (e) said stator poles and said coil means forming an annular stator assembly, (f) said rotor means including an annular nonsalient rotor assembly fixed to said shaft and disposed concentrically within said stator assembly.

(g) said rotor assembly having a substantially flat friction surface disposed radially outward from said shaft, (h) a substantially flat inertia means loosely mounted on said shaft adjacent said rotor, and (i) a substantially flat slip drive means associated with said inertia means and interposed between said rotor and inertia means, (j) resilient biasing means applying a substantially uniform biasing force to said inertia means to maintain said inertia means in contact with said slip drive means and to maintain said slip drive means in contact with said rotor friction surface to influence the output of said pinion means, (k) said inertia means and said pinion means being disposed on opposite sides of said rotor assembly adjacent said housing walls.

References Cited by the Examiner
UNITED STATES PATENTS

| | | |
|---|---|---|
| 1,447,390 | 3/23 | Kucharski. |
| 1,719,805 | 7/29 | Hammond _____ 310—74 |
| 1,922,759 | 8/33 | Davis _____ 310—49 X |
| 2,003,116 | 5/35 | Hammond _____ 310—74 |
| 2,834,896 | 5/58 | Fisher _____ 310—49 |

OTHER REFERENCES

"New Design Ideas from Japan," Design News, January 1, 1957.

MILTON O. HIRSHFIELD, *Primary Examiner.*